(12) United States Patent
Abe

(10) Patent No.: US 10,872,141 B2
(45) Date of Patent: Dec. 22, 2020

(54) METHOD AND APPARATUS FOR PROGRAM VERIFICATION

(71) Applicant: FUJITSU LIMITED, Kawasaki (JP)

(72) Inventor: Yasuhiko Abe, Niiza (JP)

(73) Assignee: FUJITSU LIMITED, Kawasaki (JP)

( * ) Notice: Subject to any disclaimer, the term of this patent is extended or adjusted under 35 U.S.C. 154(b) by 207 days.

(21) Appl. No.: 15/817,020

(22) Filed: Nov. 17, 2017

(65) Prior Publication Data

US 2018/0096132 A1 Apr. 5, 2018

Related U.S. Application Data

(63) Continuation of application No. PCT/JP2015/064428, filed on May 20, 2015.

(51) Int. Cl.
| | | |
|---|---|---|
| *G06F 21/44* | (2013.01) | |
| *G06F 21/51* | (2013.01) | |
| *G06F 21/57* | (2013.01) | |
| *G06F 9/4401* | (2018.01) | |

(52) U.S. Cl.
CPC .............. *G06F 21/44* (2013.01); *G06F 9/442* (2013.01); *G06F 21/51* (2013.01); *G06F 21/575* (2013.01); *G06F 2221/033* (2013.01)

(58) Field of Classification Search
CPC ................................ G06F 21/44; G06F 9/442
See application file for complete search history.

(56) References Cited

U.S. PATENT DOCUMENTS

| | | | |
|---|---|---|---|
| 6,026,293 A | 2/2000 | Osborn | |
| 6,263,431 B1* | 7/2001 | Lovelace | G06F 9/4406 713/2 |
| 7,533,274 B2* | 5/2009 | Freeman | G06F 21/572 713/189 |
| 8,122,258 B2* | 2/2012 | Peacock | G06F 9/4401 455/408 |
| 8,291,226 B2* | 10/2012 | Chun | G06F 21/64 711/103 |
| 8,694,763 B2* | 4/2014 | Thorsen | G06F 9/441 713/2 |
| 9,740,863 B2* | 8/2017 | Sherman | G06F 21/566 |
| 9,784,260 B2* | 10/2017 | Lee | G06F 21/72 |
| 10,153,904 B2* | 12/2018 | Roper | G06F 21/57 |

(Continued)

FOREIGN PATENT DOCUMENTS

| | | |
|---|---|---|
| EP | 2339499 | 6/2011 |
| JP | 2001-500293 | 1/2001 |

(Continued)

OTHER PUBLICATIONS

Search Query Report from IP.com (performed Mar. 12, 2020).*

(Continued)

*Primary Examiner* — Sharon S Lynch
(74) *Attorney, Agent, or Firm* — Maschoff Brennan

(57) ABSTRACT

A disclosed program verification method includes: reading out, from a first storage unit, a first value that was calculated before shutdown of the computer for each part of a first program at start of the computer; and determining whether the first program is valid based on the read out first value for each part of the first program and a second value that was calculated for each part of a second program that is valid and is stored in a second storage unit.

5 Claims, 12 Drawing Sheets

(56) References Cited

U.S. PATENT DOCUMENTS

| | | | |
|---|---|---|---|
| 2005/0066169 A1 | 3/2005 | Kiehtreiber et al. | |
| 2005/0108564 A1* | 5/2005 | Freeman | G06F 21/575 726/26 |
| 2005/0278499 A1* | 12/2005 | Durham | G06F 12/1433 711/173 |
| 2007/0192610 A1* | 8/2007 | Chun | G06F 21/575 713/176 |
| 2008/0104701 A1* | 5/2008 | Peacock | G06F 9/4401 726/22 |
| 2008/0126779 A1* | 5/2008 | Smith | G06F 21/575 713/2 |
| 2009/0193211 A1 | 7/2009 | Hu et al. | |
| 2010/0185845 A1* | 7/2010 | Takayama | G06F 21/575 713/2 |
| 2013/0125244 A1 | 5/2013 | Sugano | |
| 2014/0256419 A1* | 9/2014 | Laputz | G06F 21/57 463/29 |
| 2015/0012738 A1* | 1/2015 | Shah | H04L 9/3236 713/2 |
| 2015/0074384 A1* | 3/2015 | Yajima | G06F 21/575 713/2 |
| 2016/0357963 A1* | 12/2016 | Sherman | G06F 21/566 |

FOREIGN PATENT DOCUMENTS

| | | |
|---|---|---|
| JP | 2007-506187 | 3/2007 |
| JP | 2009-009372 | 1/2009 |
| JP | 2012-32925 | 2/2012 |
| JP | 2012-114934 | 6/2012 |
| JP | 2015-049785 | 3/2015 |
| JP | 2015-055898 | 3/2015 |

OTHER PUBLICATIONS

Search Query Report from IP.com (performed Aug. 26, 2020) (Year: 2020).*
Sansar Choinyambuu, "A Root of Trust for Measurement—Mitigating the Lying Endpoint Problem of TNC", Jun. 15, 2011 (2011-86-15), XP055462159, Retrieved from the Internet: URL:http://security.hsr.ch/mse/projects/2011_Root_of_Trust_for Measurement.pdf [retrieved on Mar. 22, 2018].
EESR from EPO Application No. 15892576.8 dated Apr. 13, 2018.
International Search Report of PCT/JP2015/064428 dated Aug. 4, 2015.
Written Opinion of the International Searching Authority of PCT/JP2015/064428 dated Aug. 4, 2015 Translation of the relevant part, Box No. V.

* cited by examiner

| TRIGGER THAT HAS ALREADY OCCURRED | TRIGGER THAT HAS NEWLY OCCURRED | COMBINATION OF TRIGGERS | CPU OCCUPANCY RATE |
|---|---|---|---|
| (1) | (2) or (4) | (1),(2) or (1),(4) | MOR * 2 |
| (2) | (1) or (3) or (4) | (2),(1) or (2),(3) or (2),(4) | MOR * 2 |
| (3) | (1) or (4) | (3),(1) or (3),(4) | MOR * 2 |
| (4) | (1) or (2) or (3) | (4),(1) or (4),(2) or (4),(3) | MOR * 2 |
| (3) | (2) | (3),(2) | MOR * 3 |
| (1) (#) | (3) | (1) (#) (3) | MOR * 3 |
| (3) (#) | (2) | (3) (#) (2) | MOR * 3 |
| (1) (#) (3) (#) | (2) | (1) (#) (3) (#) (2) | MOR * 4 |

(#): ONE OF TRIGGERS (1) to (4) OR NO TRIGGER

METHOD AND APPARATUS FOR PROGRAM VERIFICATION

CROSS-REFERENCE TO RELATED APPLICATIONS

This application is a continuing application, filed under U.S.C. section 111(a), of International Application PCT/JP2015/064428, filed on May 20, 2015, the entire contents of which are incorporated herein by reference.

FIELD

This invention relates to a technique for verification of a program.

BACKGROUND

Programs of a device that is connected to a network such as the Internet may be rewritten by unauthorized access from the outside, and the rewriting may cause serious troubles and the like in some cases. For example, unauthorized rewriting of a program installed in a car causes malfunction of the device inside the car and leads to an accident fatal to human lives.

Moreover, there are cases where a user of a device on which a program is installed intentionally rewrites the program (for example, rewrites in order to disable speed limits), which causes troubles, and the device becomes unavailable.

As a technique for verifying validness of a program, a technique called Secure Boot to check that a program such as an OS (Operating System) or the like is valid when starting a device is known. However, it takes a long time to start the device when using the Secure Boot.

Moreover, a certain document discloses the following technique. Specifically, a computer divides a program into plural pages and calculates a hash value for each of the plural pages. Then, the computer generates a hash array based on the hash values and further generates a digital signature of the hash array.

In addition, a certain document discloses the following technique. Specifically, a microprocessor executes a hash calculation on memory contents in order to find an audit hash value, and compares the audit hash value with a valid hash value found by executing the hash calculation on valid memory contents.

Moreover, a certain document discloses the following technique. Specifically, an authentication device reads out a digest table and a digital signature from a storage unit into a memory. Then, the authentication device authenticates contents data by using the digital signature and digest values included in the digest table, which were read into the memory.

However, even if the techniques described in these documents are used, it is not possible to realize both verification of validity of a program at the time of starting a device and shortening of time spent in starting the device. In other words, there is no technique to shorten time required for starting a device when verifying validity of a program at the time of starting.

Patent Document 1: Japanese National Publication of International Patent Application No. 2007-506187
Patent Document 2: Japanese National Publication of International Patent Application No. 2001-500293
Patent Document 3: Japanese Laid-open Patent Publication No. 2012-114934

SUMMARY

A program verification method relating to this invention includes: reading out, from a first storage unit, a first value that was calculated before shutdown of the computer for each part of a first program at start of the computer; and determining whether the first program is valid based on the read out first value for each part of the first program and a second value that was calculated for each part of a second program that is valid and is stored in a second storage unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Figure 1:
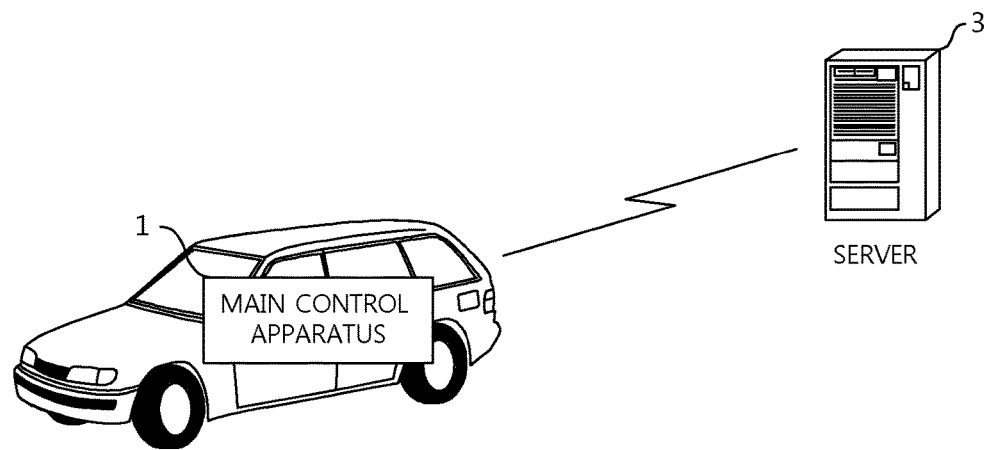
FIG. 1 is a diagram depicting an overview of a system in this embodiment.

FIG. 1 illustrates an overview of a system in this embodiment. A main control apparatus 1 embedded in, for example, a car is able to perform wireless communication with a server 3 via a network such as the Internet or a VPN (Virtual Private Network).

Drivers, an OS, middleware, application programs, and the like are installed in the main control apparatus 1 at the time of manufacture. However, there is a case where programs are additionally downloaded from the sever 3 even after starting operation. The program to be additionally installed is, for example, a program for adding a function, a corrected program and the like. Programs installed in the main control apparatus 1 has a possibility to be rewritten improperly by attacks (for example, sending malicious programs) from a network.

Figure 2:
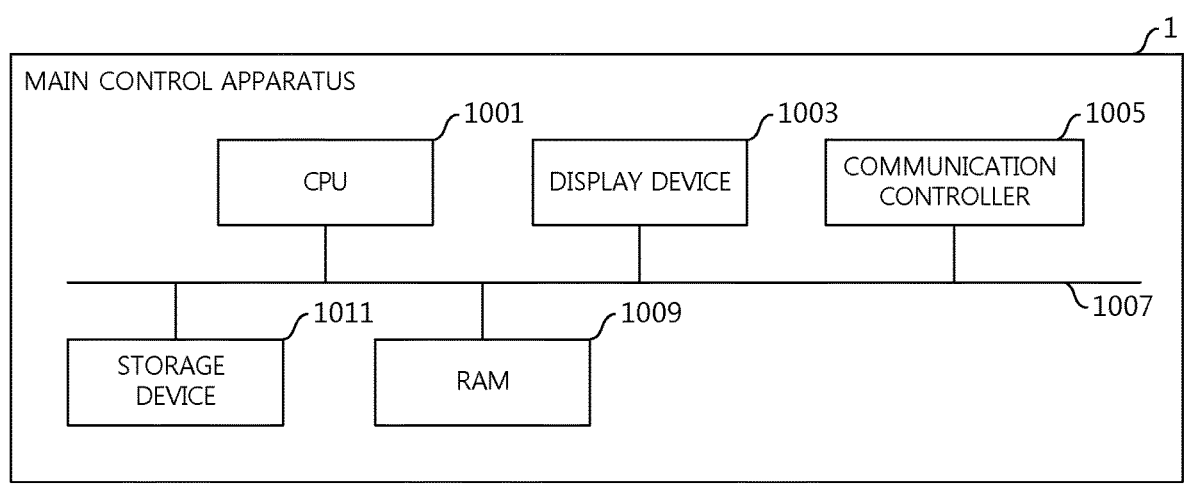
FIG. 2 is a diagram depicting a hardware configuration of a main control apparatus.

FIG. 2 illustrates a hardware configuration of the main control apparatus 1. The main control apparatus 1 has a CPU (Central Processing Unit) 1001, a display device 1003, a communication controller 1005, a bus 1007, a RAM (Random Access Memory) 1009, and a storage device 1011.

The storage device 1011 is an HDD (Hard Disk Drive), a NAND (Not AND)-type flash memory or the like, and stores a program for executing processing for this embodiment, a driver, an OS, middleware, an application program, and the like. The programs stored in the storage device 1011 are read out by the CPU 1001, loaded into the RAM 1009, and executed. A display device 1003 which is, for example, a monitor displays a screen that displays a warning, a screen for navigation or the like. The communication controller 1005 is a hardware for performing communication via a network.

Figure 3:
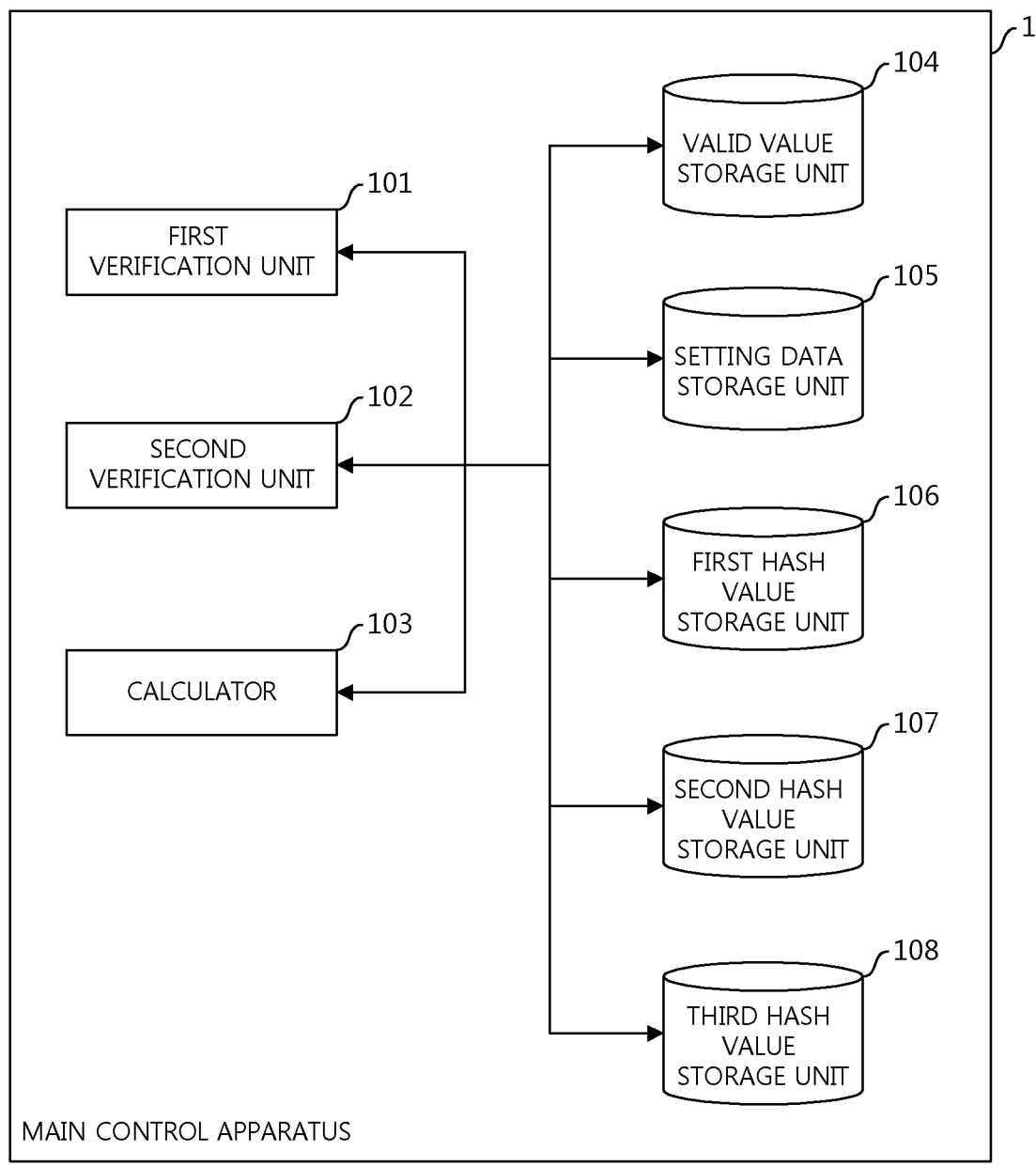
FIG. 3 is a functional block diagram of the main control apparatus.

FIG. 3 illustrates a functional block diagram of the main control apparatus 1. The main control apparatus 1 includes a first verification unit 101, a second verification unit 102, a calculator 103, a valid value storage unit 104, a setting data storage unit 105, a first hash value storage unit 106, a second hash value storage unit 107 and a third hash value storage unit 108.

The first verification unit 101 executes processing to determine validity of a program loaded in the RAM 1009 at the time of starting the main control apparatus 1. Specifically, the first verification unit 101 calls the calculator 103, and the calculator 103 executes processing based on data stored in the valid value storage unit 104, data stored in the setting data storage unit 105 and data stored in the first hash value storage unit 106. And the calculator 103 stores results of the processing in the second hash value storage unit 107 and the third hash value storage unit 108. The second verification unit 102 executes processing to determine validity of a program loaded in the RAM 1009 after starting the main control apparatus 1. Specifically, the second verification unit 102 calls the calculator 103, and the calculator 103 executes processing based on the data stored in the valid value storage unit 104 and the data stored in the setting data storage unit 105. And the calculator 103 stores results of the processing in the first hash value storage unit 106, the second hash value storage unit 107, and the third hash value storage unit 108. The valid value storage unit 104, the setting data storage unit 105, the first hash value storage unit 106, the second hash value storage unit 107, and the third hash value storage unit 108 is provided in the storage device 1011. Therefore, even when the power of the main control apparatus 1 is turned off, data is not erased.

Figure 4:
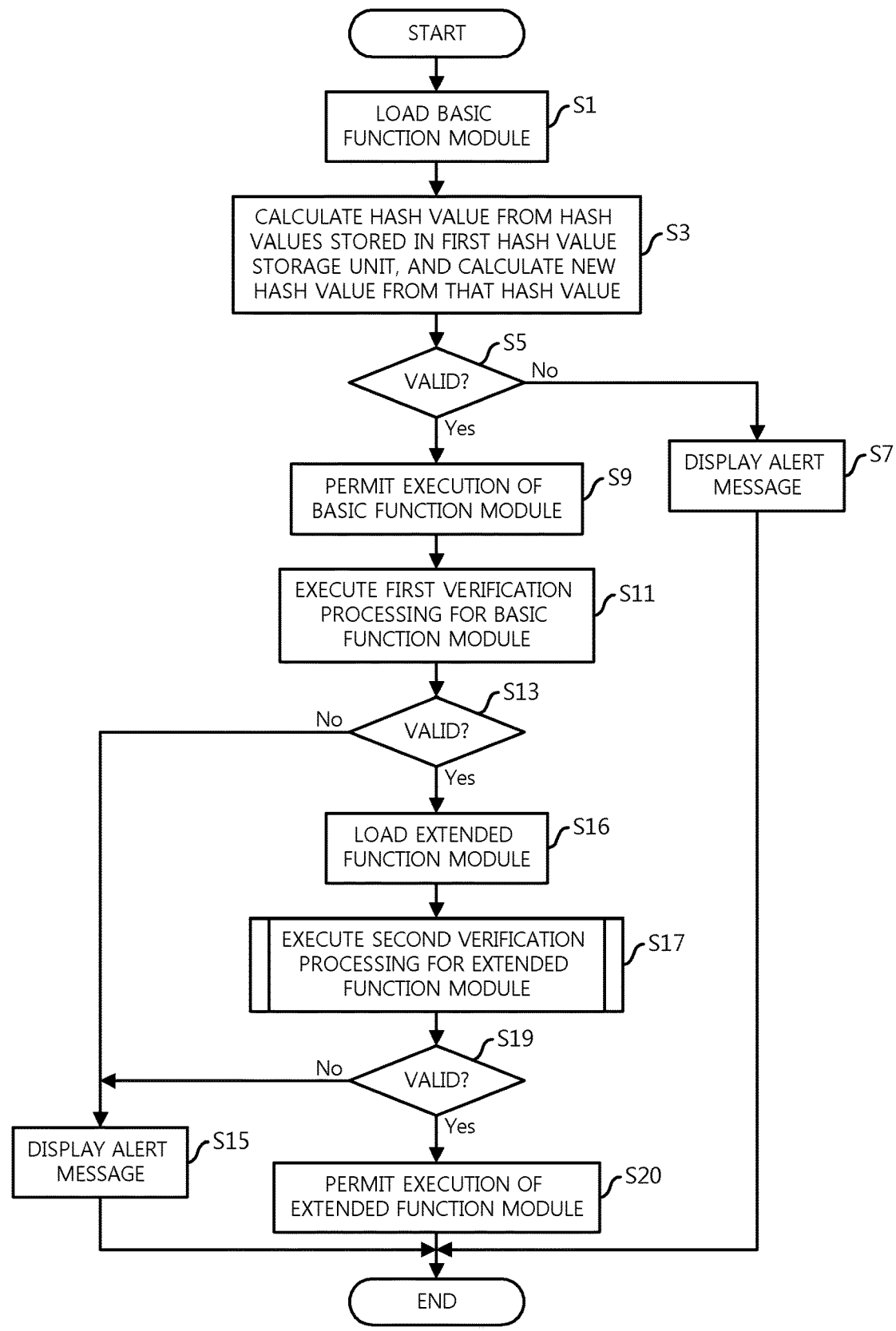
FIG. 4 is a diagram depicting a processing flow of processing executed at the time of starting the main control apparatus.

Next, with reference to FIGS. 4 to 15, processing executed by the main control apparatus 1 will be explained. For example, a driver of the car powers on the main control apparatus 1. When the main control apparatus 1 is powered on, the CPU 1001 of the main control apparatus 1 loads a basic function module stored in the storage device 1011 into the RAM 1009 (FIG. 4: step S1).

Figure 5:
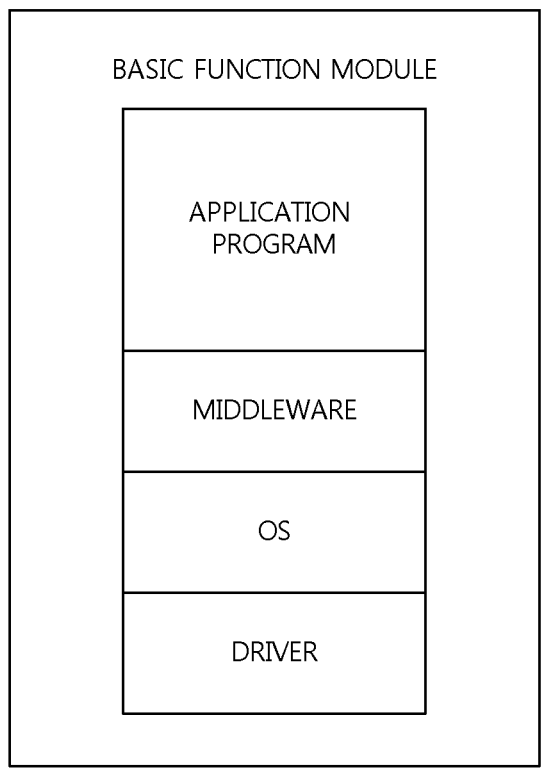
FIG. 5 is a diagram for explaining basic function module.

The basic function module includes programs initially installed in devices and programs for realizing basic functions. Therefore, as illustrated in FIG. 5, for example, the basic function module includes a driver for controlling devices of the main control apparatus 1, an OS, middleware for realizing basic functions, and an application program.

The first verification unit 101 of the main control apparatus 1 calls the calculator 103. Then, the calculator 103 reads out hash values stored in the first hash value storage unit 106, calculates a new hash value from the read out hash values, and stores it in the second hash value storage unit 107. Furthermore, the calculator 103 newly calculates a hash value from the calculated hash value (step S3) and stores it in the third hash value storage unit 108.

Figure 6:
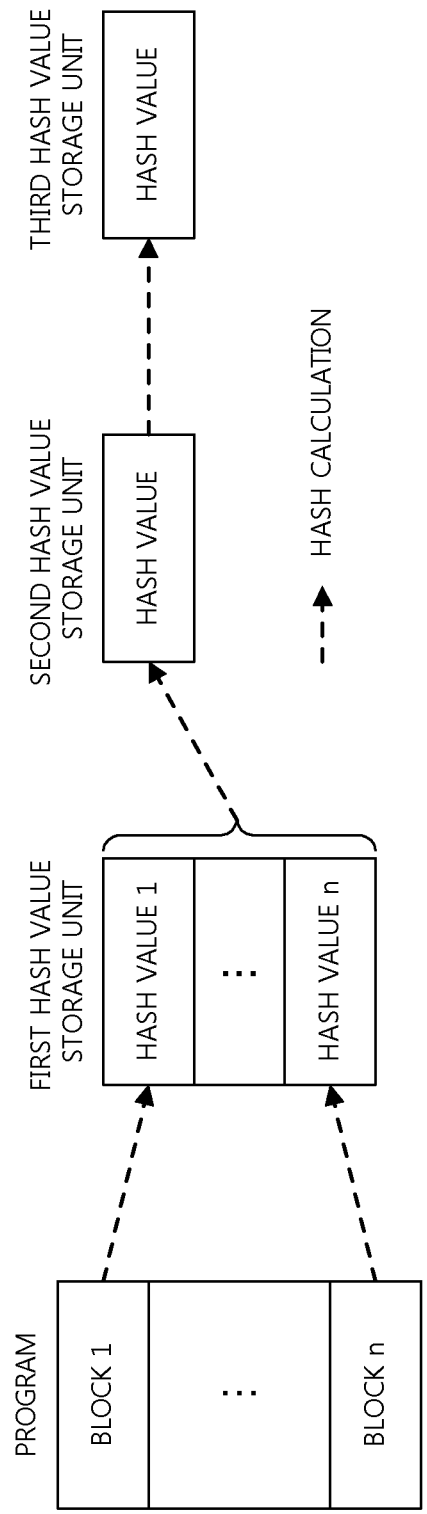
FIG. 6 is a diagram for explaining hash calculation in this embodiment.

With reference to FIG. 6, the hash calculation in this embodiment will be explained. In FIG. 6, a dashed arrow represents hash calculation. In this embodiment, a program, which is a target of hash calculation and has been loaded in the memory, is divided into a predetermined number of blocks (n in FIG. 6 (n is a natural number that is 2 or more)), and a hash value is calculated from each block of the divided blocks. In this case, n hash values are calculated and are stored in the first hash value storage unit 106.

Then, one hash value is newly calculated from the n number of hash values stored in the first hash value storage unit 106. Then, the calculated hash value is stored in the second hash value storage unit 107.

Furthermore, one hash value is calculated from the hash value stored in the second hash value storage unit 107 and is stored in the third hash value storage unit 108. In an example of FIG. 6, since one hash value is stored in the second hash value storage unit 107, one hash value is calculated from one hash value. In this case, the second hash value may be used as it is as the third hash value.

Figure 7:
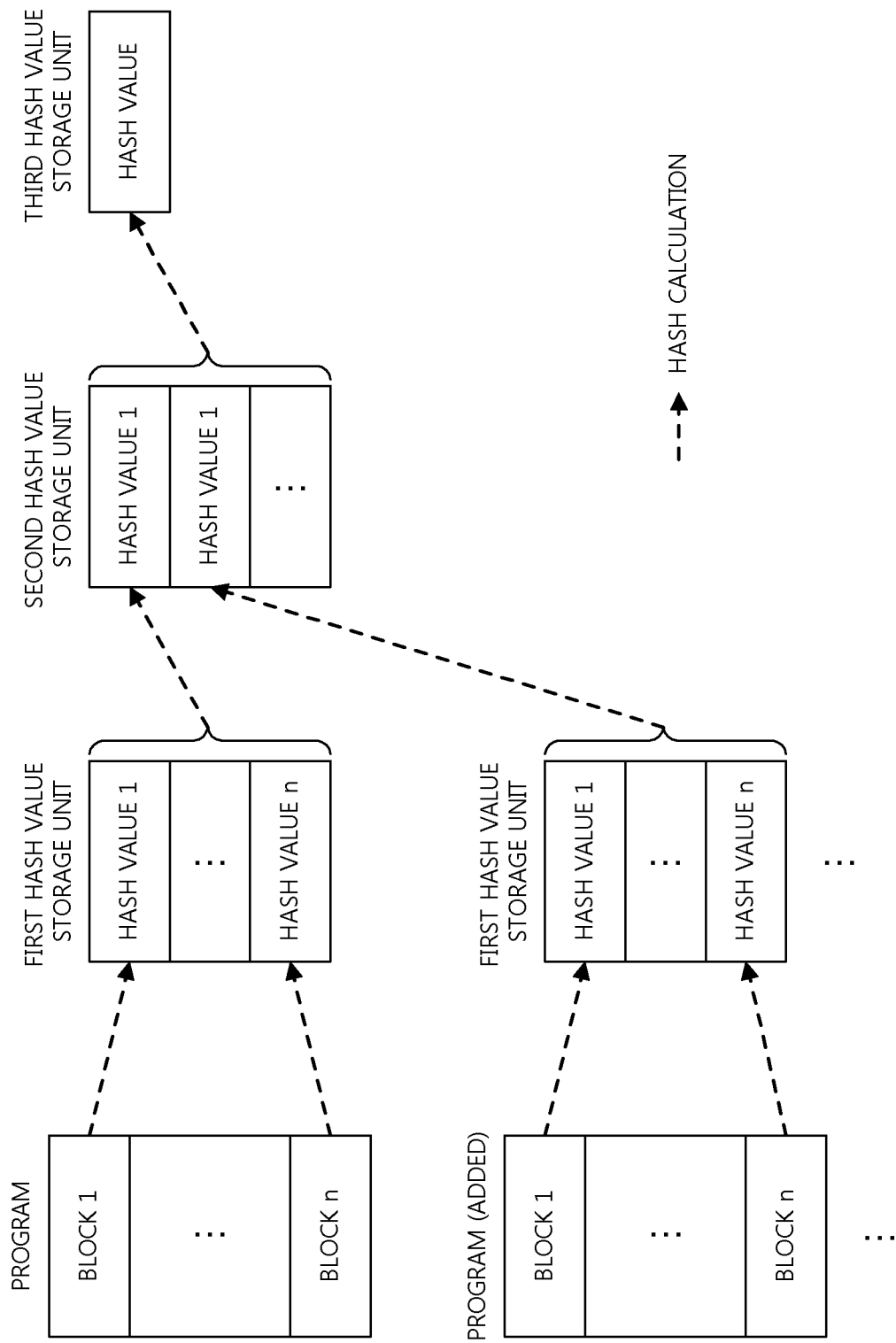
FIG. 7 is a diagram for explaining the hash calculation in this embodiment.

With reference to FIG. 7, hash calculation in a case where a program is additionally loaded in the RAM 1009 after starting the main control apparatus 1 will be explained. In FIG. 7, a dashed arrow represents hash calculation. In the case where a program is additionally loaded, originally loaded program is divided into n blocks, and each of additionally loaded programs is also divided into n blocks. N hash values are calculated from the originally loaded program and n hash values are calculated from each of the additionally loaded programs, and the calculated hash values are stored in the first hash value storage unit 106.

Then, for the originally loaded program, one hash value is newly calculated from the n hash values stored in the first hash value storage unit 106 and is stored in the second hash value storage unit 107. For each of the additionally loaded programs, one hash value is newly calculated from the n hash values stored in the first hash value storage unit 106 and is stored in the second hash value storage unit 107.

Further, one hash value is calculated from the hash values stored in the second hash value storage unit 107 and is stored in the third hash value storage unit 108. In an example of FIG. 7, because the number of hash values stored in the second hash value storage unit 107 is 2 or more, one hash value is calculated from 2 or more hash values.

As described above, there are processing to calculate hash values from a program and processing to calculate a hash value from hash values, and the cause of prolongation of time spent in starting is the former processing. Therefore, in step S3, by using hash values calculated before the main control apparatus 1 shut down, it becomes possible to shorten time required for completing calculation of a hash value to be stored in the third hash value storage unit 108.

Figure 8:
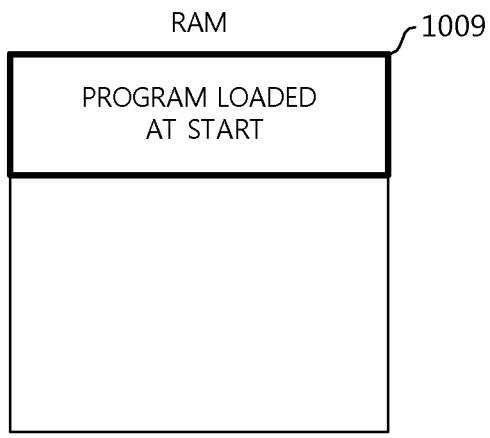
FIG. 8 is a diagram for explaining state transition of a RAM.
Figure 9:
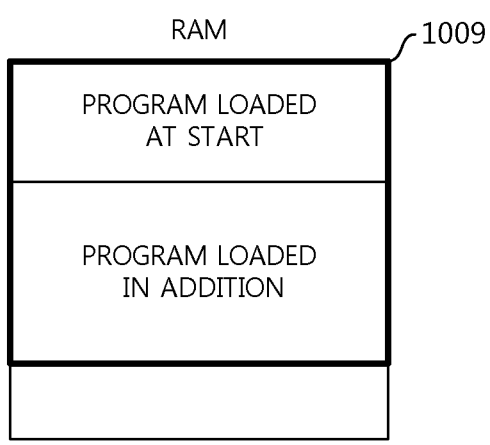
FIG. 9 is a diagram for explaining the state transition of the RAM.
Figure 10:
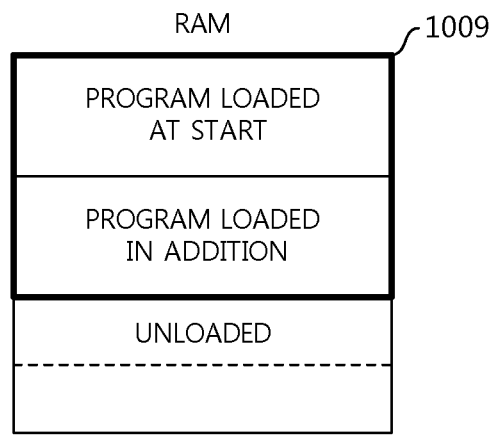
FIG. 10 is a diagram for explaining the state transition of the RAM.

FIGS. 8 to 10 illustrate state transition of the RAM 1009. FIG. 8 is a diagram depicting a state of the RAM 1009 immediately after start. In the RAM 1009, programs (in this embodiment, the basic function module and the extended function module) loaded at the time of start are stored. In this case, programs that are targets of hash calculation are programs loaded at the time of start, which are surrounded by a thick solid line.

FIG. 9 is a diagram depicting a state of the RAM 1009 when a program is additionally loaded after start. In the RAM 1009, a program loaded at the time of start and a program additionally loaded after start are stored. In this case, programs that are targets of hash calculation are programs loaded at the time of start and programs additionally loaded after start, which are surrounded by a thick solid line.

FIG. 10 is a diagram depicting a state of the RAM 1009 when some programs are unloaded. In the RAM 1009, programs loaded at the time of start and programs additionally loaded after start are stored. However, because some of the programs additionally loaded after start have been unloaded, an area where programs are stored is narrow compared to the state of FIG. 9. In this case, programs that are targets of hash calculation are programs loaded at the time of start and programs that have not been unloaded among programs additionally loaded after start, which are surrounded by a thick solid line. Hash values stored in the first hash value storage unit 106 and hash values corresponding to unloaded programs among hash values stored in the second hash value storage unit 107 are deleted.

Returning to the explanation of FIG. 4, the first verification unit 101 reads out a hash value calculated from a valid program from the valid value storage unit 104, and reads out the hash value calculated in the step S3 from the third hash value storage unit 108. Then, the first verification unit 101 determines whether programs installed in the main control apparatus 1 are valid (namely, it is not rewritten) depending on whether or not the former hash value and the latter hash value match (step S5). However, the program to be verified in step S5 is a program before the main control apparatus 1 shut down, and they are not programs installed in the main control apparatus 1 at the time of step S5. The programs before shutdown of the main control apparatus 1 include the basic function module, the extended function module, additionally installed programs, and the like.

Figure 11:
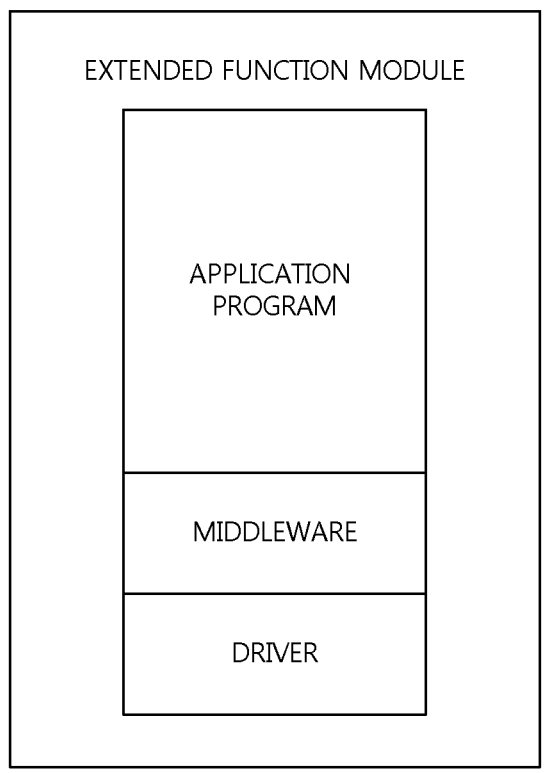
FIG. 11 is a diagram for explaining extended function modules.

Assume that a valid value is stored in the valid value storage unit 104 for each of the entire program, basic function module, extended function module, and the like. Moreover, in the case of downloading a program and loading the program additionally, the valid value is recalculated at the time of downloading. The extended function module includes a program for realizing functions other than basic functions. Therefore, as illustrated in FIG. 11, for example, the extended function module includes a driver, middleware, and application program for realizing extended functions.

Returning to the explanation of FIG. 4, when the program are not valid (step S5: No route), the first verification unit 101 causes the display device 1003 to display an alert message that represents the programs are not valid (step S7). Then, the processing ends.

On the other hand, when the programs are valid (step S5: Yes route), the first verification unit 101 permits the CPU 1001 to execute the basic function module loaded in the RAM 1009 in step S1 (step S9). In response to this, the CPU 1001 starts executing the basic function module.

The first verification unit 101 calls the calculator 103 to execute first verification processing for the basic function module loaded in the RAM 1009 (step S11). In step S11, the basic function module is divided into n blocks, and hash values are calculated by the method explained with reference to FIG. 6. Since size of the basic function module is smaller than that of the extended function module described later, in the first verification processing, cyclic hash calculation is not performed. Then, the first verification unit 101 compares the hash value calculated for the basic function module (in this case, the hash value stored in the third hash value storage unit 108) with the hash value stored in the valid value storage unit 104 to determine whether the basic function module is valid (step S13).

When the basic function module is not valid (step S13: No route), the first verification unit 101 causes the display device 1003 to display an alert message representing that the basic function module is not valid (step S15). Then, the processing ends.

On the other hand, if the basic function module is valid (step S13: Yes route), the first verification unit 101 loads the extended function module into the RAM 1009 (step S16).

The first verification unit 101 calls the calculator 103 to execute second verification processing for the extended function module loaded in the RAM 1009 (step S17). Since size of the extended function module is larger than that of the basic function module, cyclic hash calculation is performed in the second verification processing. The second verification processing will be explained with reference to FIGS. 12 and 13.

Figure 12:
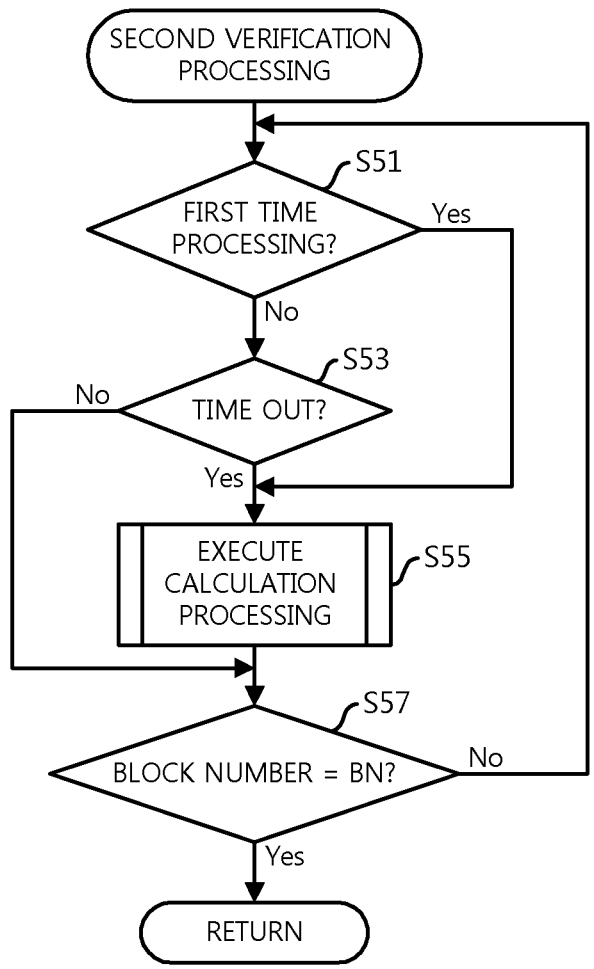
FIG. 12 is a diagram depicting a processing flow for second verification processing.

First, the calculator 103 determines whether it is the first time processing (that is, whether the calculation processing described later has not been executed yet in this call) (FIG. 12: step S51). When it is not the first time processing (step S51: No route), the calculator 103 determines whether a timeout of a cycle timer has occurred (step S53). When the timeout of the cycle timer has not occurred (step S53: No route), the processing shifts to processing of step S57. The cycle timer is a timer for managing a cycle for calculating in step S55.

On the other hand, when it is the first time processing (step S51: Yes route) or when the timeout has occurred (step S53: Yes route), the calculator 103 executes calculation processing (step S55). The calculation processing will be explained with reference to FIG. 13.

Figure 13:
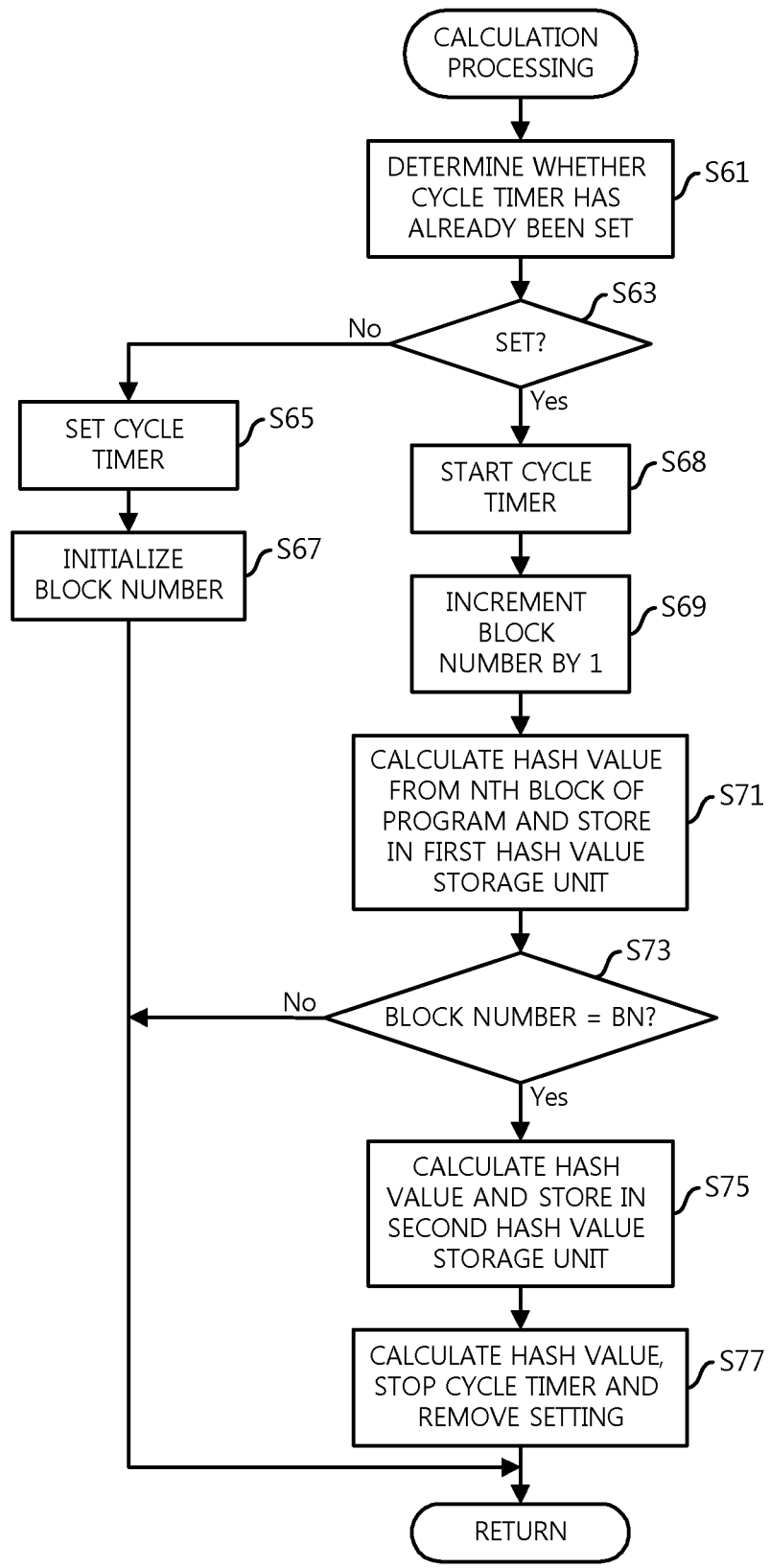
FIG. 13 is a diagram depicting a processing flow for calculation processing.

First, the calculator 103 determines whether or not the cycle timer has been set (FIG. 13: step S61). In step S61, it is determined whether or not a cycle CIT (second) of the cycle timer has already been set.

When the cycle timer has not been set (step S63: No route), the calculator 103 sets the cycle CIT of the cycle timer (step S65). By using such cycle CIT, processing for calculating a hash value from one block is executed within a predetermined time. As a result, time spent in completing the hash calculation for all blocks is almost constant.

In this embodiment, at the time of designing of the main control apparatus 1, a designer sets the cycle CIT and the number BN for division of the program in advance. In step S65, CIT is set as an initial cycle of the cycle timer. CIT, BN, and the maximum allowable time MOCT (second) that is the maximum time that is allowed to be spent in calculating hash values from all blocks are used in calculating hash values from the program.

Moreover, when selecting hardware of the main control apparatus 1 and designing software of the main control apparatus 1, size APS (bytes) of an initial program and a processing speed CPP (bytes/second) of processing to calculate a hash value from the program are set by the designer in advance.

Moreover, in the design of a device, the designer or the like preferentially sets values for the maximum delay time MRT (second) of a response to an event and the maximum CPU occupancy rate MOR (%). The maximum delay time of a response to an event is the maximum time that is allowed to be spent in completing control performed when a specific event occurred.

These parameters are stored in advance in the setting data storage unit 105. These parameters are set so that relationships that are MOCT>APS/(CPP*MOR), MRT>(APS/BN)/CPP and MOR>((APS/BN)/CPP)/CIT hold.

From these relationship, it is possible to derive relationships that are BN>APS/(MRT*CPP), CIT>APS/(MOR*CPP*BN), and MOCT>APS/(MOR*CPP).

Returning to the explanation of FIG. 13, the calculator 103 initializes a block number N (step S67). In step S67, "0" is set as the block number N. Then, the processing returns to the calling-source processing.

On the other hand, when the cycle timer has already been set (step S63: Yes route), the calculator 103 starts the cycle timer (step S68). By the processing of step S68, measurement of time is started.

The calculator 103 increments the block number N by 1 (step S69). Then, the calculator 103 calculates a hash value from the Nth block in the program (here, the extended function module) loaded in the RAM 1009 and stores it in the first hash value storage unit 106 (step S71).

The calculator 103 determines whether the block number N=BN holds (step S73). When the block number N=BN does not hold (step S73: No route), the processing returns to the calling-source processing.

On the other hand, when the block number N=BN holds (step S73: Yes route), the calculator 103 newly calculates a hash value from the hash values stored in the first hash value storage unit 106, and stores it in the second hash value storage unit 107 (step S75).

The calculator 103 newly calculates a hash value from the hash value stored in the second hash value storage unit 107 and stores it in the third hash value storage unit 108. Then, the calculator 103 stops the cycle timer and removes the setting (step S77). Then, the processing returns to the calling-source processing.

Returning to the explanation of FIG. 12, the calculator 103 determines whether or not the block number N=BN holds (step S57). When block number N=BN does not hold (step S57: No route), the processing returns to step S51. On the other hand, when the block number N=BN holds (step S57: Yes route), the processing returns to the calling-source processing.

Returning to the explanation of FIG. 4, the first verification unit 101 compares the hash value calculated for the extended function module (in this case, the hash value stored in the third hash value storage unit 108) with the hash value stored in the valid value storage unit 104 to determine whether the extended function module is valid (step S19).

When the extended function module is not valid (step S19: No route), the first verification unit 101 causes the display device 1003 to display an alert message representing that the extended function module is not valid (step S15). Then, the processing ends.

On the other hand, when the extended function module is valid (step S19: Yes route), the first verification unit 101 permits the CPU 1001 to execute the extended function module loaded in the RAM 1009 in step S16 (step S20). In response to this, the CPU 1001 starts execution of the extended function module. Then, the processing ends.

By executing the aforementioned processing, it is possible not to calculate hash values from a program at the time of starting, and it becomes possible to shorten time required for starting. Moreover, the size of the extended function module is large compared to the basic function module, and it takes time to perform verification as it is. However, since the block number BN, the cycle CIT and the like are set in advance and hash values are calculated according to them, it becomes possible to prevent time required for verification from becoming longer. According to this embodiment, verification of the extended function module is to be completed in almost constant time.

Then, when it is determined that the program is not valid (for example, it is not the same as the program at the time of manufacture), an alert message is displayed, and the user is able to respond in accordance with the alert message.

Next, with reference to FIGS. 14 and 15, processing executed by the main control apparatus 1 after starting will be explained. A thread for executing this processing is periodically activated. This processing may be performed in parallel by plural threads.

Figure 14:
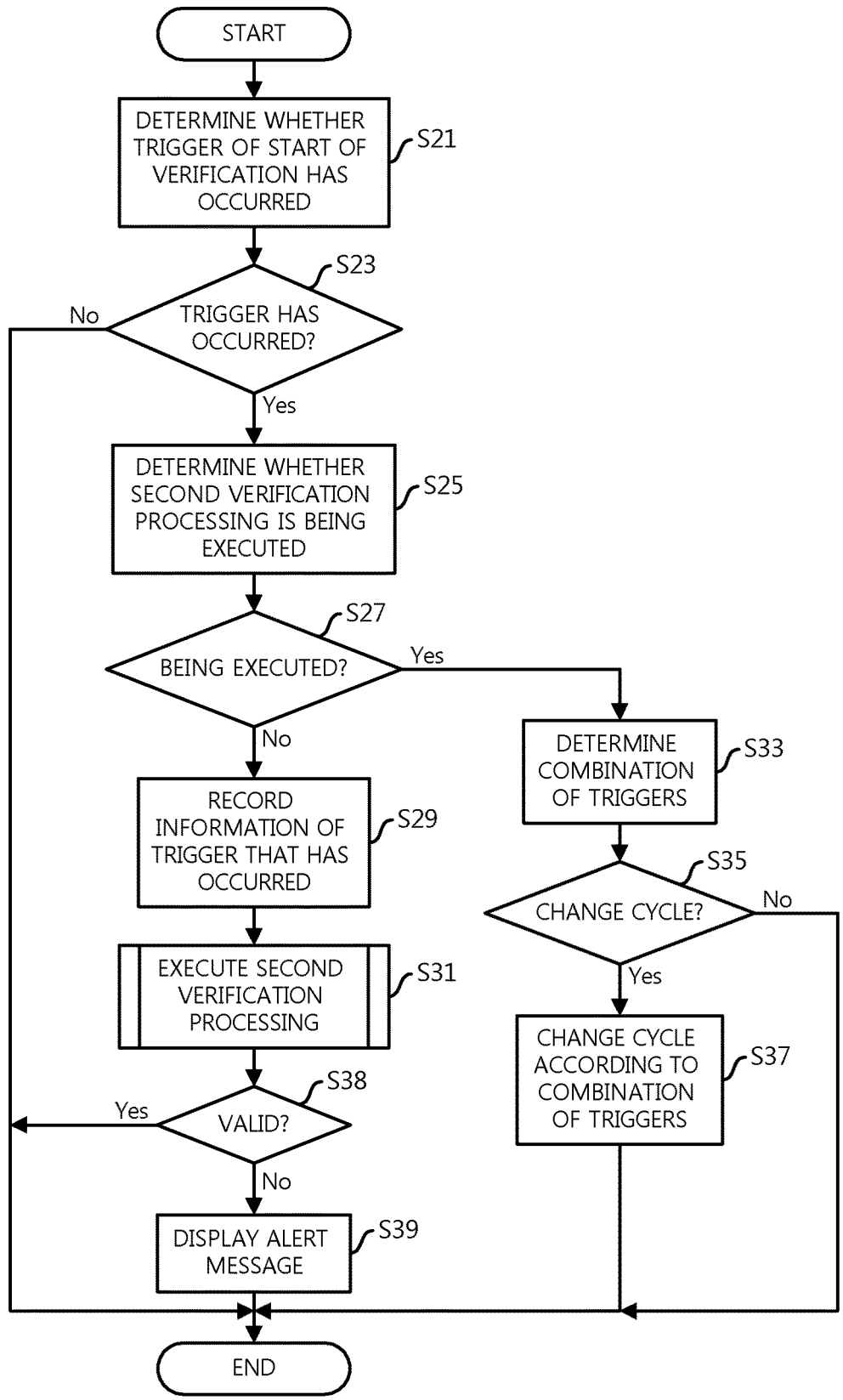
FIG. 14 is a diagram depicting a processing flow for processing to be executed by the main control apparatus after start.

First, the second verification unit 102 determines whether a trigger of start of verification has occurred (FIG. 14: step S21). In this embodiment, the trigger of start of verification is such that (1) an amount of data received per unit time exceeds a threshold (hereinafter, referred to as RT), (2) an amount of data to be sent per unit time exceeds a threshold (hereinafter, referred to as ST), (3) rewriting to an area where the basic function module was loaded has occurred, (4) an amount of data rewritten in an area where the extended function module was loaded has exceeded a threshold, or (5) a certain period of time has elapsed since the last trigger occurred. However, it is assumed that RT>ST holds and RT and ST are larger than the maximum amount of communication data, which is an assumed amount at the time of designing.

When the trigger of start of verification has not occurred (step S23: No route), the processing ends. When the trigger of start of verification occurred (step S23: Yes route), the second verification unit 102 determines whether the second verification processing is being executed (step S25). Since the trigger described above occurs at an arbitrary timing, a new trigger may occur during execution of the second verification processing, and there is a case where the second verification processing is executed redundantly.

When the second verification processing is not being executed (step S27: No route), the second verification unit 102 records information on the trigger determined in step S21 to have occurred (step S29). Then, by calling the calculator 103, the second verification unit 102 executes the second verification processing for the program loaded in the RAM 1009 (step S31). The second detection processing has been explained with reference to FIGS. 12 and 13, and the explanation is omitted here. The program that is a target of verification in step S31 includes the basic function module, the extended function module, and the additionally loaded program.

Assume that the second verification unit 102 restores the changed cycle CIT to a default value when the second verification processing in step S31 has been completed.

The second verification unit 102 compares the hash value calculated for the program loaded in the RAM 1009 (in this case, the hash value stored in the third hash value storage unit 108) with the hash value stored in the valid value storage unit 104 to determine whether the program loaded in the RAM 1009 is valid (step S38).

When the program loaded in the RAM 1009 is not valid (step S38: No route), the second verification unit 102 causes the display device 1003 to display an alert message representing that the program loaded in the RAM 1009 is not valid (step S39). When the program loaded in the RAM 1009 is valid (step S38: Yes route), the processing ends.

On the other hand, when the second verification processing is being executed (step S27: Yes route), the second verification unit 102 records information on the trigger that has occurred this time, and determines a combination of the trigger that has already occurred and the trigger that has occurred this time (step S33). Since the information on the trigger that has occurred is recorded in steps S29 and S33, the combination is determined using that information.

Figures 15, 16:
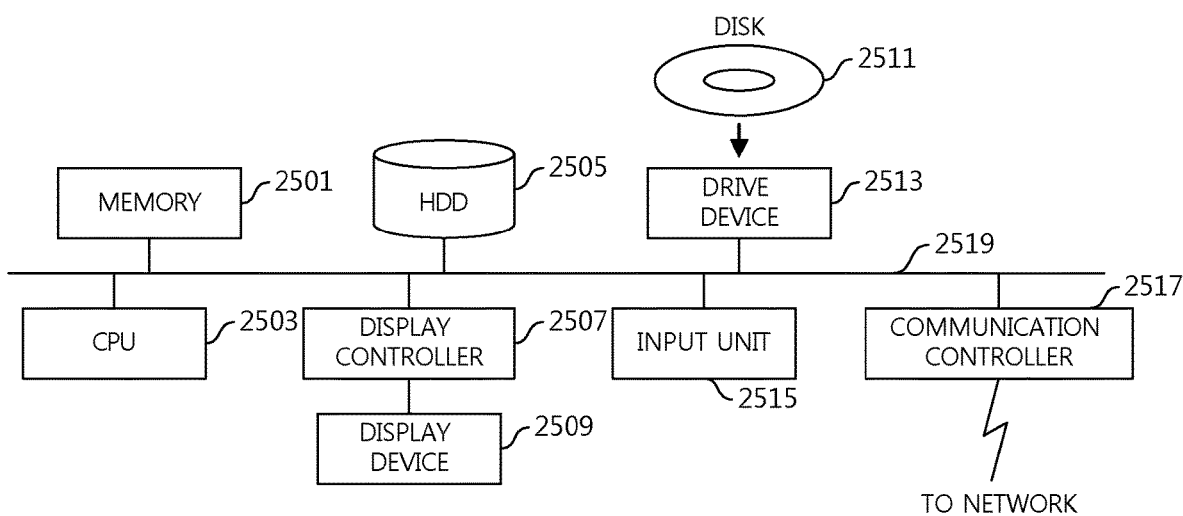
FIG. 15 is a diagram depicting a relationship between combinations of triggers and CPU occupancy rates.
FIG. 16 is a functional block diagram of a computer.

FIG. 15 illustrates a relationship between combinations of triggers that have occurred and MOR. The numbers in parentheses represents triggers that were used in the explanation of step S21. However, only combinations of triggers (1) to (4) are illustrated here. "(#)" represents that one of the triggers (1) to (4) occurs or no trigger occurs. As illustrated in FIG. 15, in this embodiment, the greater the number of triggers included in the combination of triggers is, the larger value MOR is set to. Then, according to CIT>APS/(MOR*CPP*BN), CIT becomes shorter. This makes time required for calculating a hash value from one block shorter. However, setting is made so that MOR does not become 100(%).

Returning to the explanation of FIG. 14, the second verification unit 102 determines whether the cycle CIT is changed (step S35). When the cycle CIT is not changed (step S35: No route), the processing ends. On the other hand, when the cycle CIT is changed (step S35: Yes route), the second verification unit 102 changes MOR according to the combination of triggers and the relationship illustrated in FIG. 15. Further, the second verification unit 102 changes the cycle CIT according to the changed MOR (step S37). Then, the processing ends. In addition, once the cycle CIT is changed, the value of the cycle CIT is not restored to the default value until the second verification processing in step S31 is completed.

By executing the aforementioned processing, it is possible to change the cycle CIT according to the state, and it becomes possible to further suppress time required for the verification processing.

Moreover, since the verification is started only when a trigger occurs after starting, an excessive load does not occur on the CPU 1001.

Although the embodiment of this invention was explained above, this invention is not limited to those. For example, the functional block configuration of the main control apparatus 1 described above does not always correspond to actual program module configuration.

Moreover, the aforementioned configuration of data storage is a mere example, and may be changed. Furthermore, as for the processing flow, as long as the processing results do not change, the turns of the steps may be exchanged or the steps may be executed in parallel.

The start may be stopped when the basic function module or the extended function module is determined not to be valid at the time of starting.

In addition, the aforementioned server 3 is a computer apparatus as illustrated in FIG. 16. That is, a memory 2501, a CPU 2503 (Central Processing Unit), a hard disk drive (HDD) 2505, a display controller 2507 connected to a display device 2509, a drive device 2513 for a removable disk 2511, an input unit 2515, and a communication controller 2517 for connection with a network are connected through a bus 2519 as illustrated in FIG. 16. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned processing is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer device as stated above, the hardware such as the CPU 2503 and the memory 2501, the OS and the application programs systematically cooperate with each other, so that various functions as described above in details are realized.

The aforementioned embodiment of this invention may be summarized as follows.

A program verification method relating to this embodiment includes: (A) reading out, from a first storage unit, a first value that was calculated before shutdown of the computer for each part of a first program at start of the computer; and (B) determining whether the first program is valid based on the read out first value for each part of the first program and a second value that was calculated for each part of a second program that is valid and is stored in a second storage unit.

In this way, because it is unnecessary to perform processing to calculate a value from a program at the start of the computer, it becomes possible to reduce time required for the start.

Moreover, the program verification method may further include: (C) determining whether a start condition that is a condition for start of verification is satisfied after start of the computer; (D) first calculating, within a first period, a third value for each part of a third program loaded in a memory, when the start condition is satisfied; and (E) determining whether the third program is valid based on the second value for each part of the second program and the third value calculated for each part of the third program. In this way, it becomes possible to prevent time required for calculating a value for each part of a program from becoming longer.

Moreover, the program verification method may further include (F) second calculating the third value for each part of the third program within a second period that is shorter than the first period, when the start condition is further satisfied during the first calculating. In this way, it becomes possible to shorten time for completing verification when the start condition is satisfied in a superimposed manner.

Moreover, the aforementioned start condition may include at least one of a condition that an amount of data that the computer has received per unit time exceeds a first amount, a condition that an amount of data that the computer has transmitted per unit time exceeds a second amount, a condition that a first part that includes an operating system in the third program has been rewritten, a condition that an amount of data that has been written in an area in which parts other than the first part were loaded exceeds a third amount, and a condition that a predetermined time has elapsed since the start condition was satisfied last time. In this way, it becomes possible to start verification when there is a possibility that a program will be rewritten.

Moreover, the program verification method may further include: (G) third calculating, within the first period, a fourth value for each part of a fourth program that is other than the third program, when the fourth program is additionally loaded in the memory after start of the computer; and (H) determining whether the third program and the fourth program are valid based on the third value for each part of the third program, the fourth value calculated for each part of the fourth program and the second value for each part of the second program. In this way, even in the case where another program is additionally loaded, it becomes possible to determine validity of the another program while preventing time required for calculating a value from becoming longer.

Moreover, the program verification method may further include: (I) determining the first period and the second period based on at least one of size of the third program, an occupancy rate of a processor, an amount of data that the computer is able to process per unit time, and a number of parts of the third program. In this way, it becomes possible to properly calculate the first period and the second period.

Moreover, the first value for each part of the first program and the second value for each part of the second program may be hash values.

Incidentally, it is possible to create a program causing a processor to execute the aforementioned processing, and such a program is stored in a computer readable storage medium or storage device such as a flexible disk, CD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A program verification method, comprising:
at start of a computer, reading out, from a first storage unit by the computer, a first hash value that was calculated before shutdown of the computer for each part of a first program;
at the start of the computer, first determining, by the computer, whether the first program is valid based on the read out first hash value for each part of the first program and a second hash value that was calculated for each part of a valid first program and was previously stored in a second storage unit;
after completion of the start of the computer and determination in the first determining that the first program is valid, second determining, by the computer, whether a condition for start of second verification is satisfied;
first calculating, by the computer, a third hash value for each of a fixed number of parts of a second program that is loaded in a memory in addition to the first program, when the condition is satisfied, wherein a size of the second program is larger than a size of the first program;
third determining, by the computer, whether the second program is valid based on the third hash value calculated for each of the fixed number of parts of the second program and a fourth hash value that was calculated for each of the fixed number of parts of a valid second program and was previously stored in the second storage unit,
wherein the condition includes at least one of a second condition that an amount of data that the computer has received from a network per unit time exceeds a first amount, a third condition that an amount of data that the computer has transmitted to the network per unit time exceeds a second amount, and a fourth condition that an amount of data that has been written in a memory area to which parts other than an operating system in the first valid program were loaded exceeds a third amount.

2. The program verification method as set forth in claim 1, wherein the first calculating is executed within a first period, and the program verification method further comprises second calculating, by using the computer, the third hash value within a second period that is shorter than the first period, when the condition is further satisfied during the first calculating.

3. The program verification method as set, forth in claim 2, wherein the program verification method further comprises determining, by the computer, the first period and the second period based on at least one of a size of the second program, an occupancy rate of a processor of the computer, an amount of data that the computer is able to process per unit time, and a number of parts of the second program.

4. A non-transitory computer-readable storage medium storing a program that causes a computer to execute a process, the process comprising:
at start of the computer, reading out, from a first storage unit, a first hash value that was calculated before shutdown of the computer for each part of a first program;
at the start of the computer, first determining whether the first program is valid based on the read out first hash value for each part of the first program and a second hash value that was calculated for each part of a valid first program and was previously stored in a second storage unit;
after completion of the start of the computer and determination in the first determining that the first program is valid, second determining whether a condition for start of second verification is satisfied;
first calculating a third hash value for each of a fixed number of parts of a second program that is loaded in a memory in addition to the first program, when the condition is satisfied, wherein a size of the second program is larger than a size of the first program; and
third determining whether the second program is valid based on the third hash value calculated for each of the fixed number of parts of the second program and a hash fourth value that was calculated for each of the fixed number of parts of a valid second program and was previously stored in the second storage unit,
wherein the condition includes at least one of a second condition that an amount of data that the computer has received from a network per unit time exceeds a first amount, a third condition that an amount of data that the computer has transmitted to the network per unit time exceeds a second amount, and a fourth condition that an amount of data that has been written in a memory area to which parts other than an operating system in the first valid program were loaded exceeds a third amount.

5. An information processing apparatus, comprising: a memory; a processor coupled to the memory and configured to:
at a start of the information processing apparatus, read out, from a first storage unit, a first hash value that was calculated before shutdown of the information processing apparatus for each part of a first program;

at the start of the information processing apparatus, first determine whether the first program is valid based on the read out first hash value for each part of the first program and a second hash value that was calculated for each part of a valid first program and was previously stored in a second storage unit;

after completion of the start of the information processing apparatus and determining in the first determining that the first program is valid, determine whether a condition for start of second verification is satisfied;

calculate a third hash value for each of a fixed number of parts of a second program that is loaded in a memory in addition to the first program, when the condition is satisfied, wherein a size of the second program is larger than a size of the first program; and determine whether the second program is valid based on the third hash value calculated for each of the fixed number of parts of the second program and a fourth hash value that was calculated for each of the fixed number of parts of a valid second program and was previously stored in the second storage unit, wherein the condition includes at least one of a second condition that an amount of data that the information processing apparatus has received from a network per unit time exceeds a first amount, a third condition that an amount of data that the information processing apparatus has transmitted to the network per unit time exceeds a second amount, and a fourth condition that an amount of data that has been written in a memory are to which parts other than an operating system in the first program were loaded exceeds a third amount.

* * * * *